United States Patent
Orth et al.

(10) Patent No.: US 9,340,641 B2
(45) Date of Patent: May 17, 2016

(54) POLYETHER-MODIFIED EPOXY AMINE ADDUCTS AS WETTING AND DISPERSING AGENTS

(75) Inventors: Ulrich Orth, Wesel (DE); Heribert Holtkamp, Wesel (DE); Jürgen Omeis, Dorsten-Lembeck (DE)

(73) Assignee: BYK-Chemie GmbH, Wesel (DE)

( * ) Notice: Subject to any disclaimer, the term of this patent is extended or adjusted under 35 U.S.C. 154(b) by 934 days.

(21) Appl. No.: 13/511,587

(22) PCT Filed: Dec. 8, 2010

(86) PCT No.: PCT/EP2010/069182
§ 371 (c)(1),
(2), (4) Date: Oct. 3, 2012

(87) PCT Pub. No.: WO2011/070074
PCT Pub. Date: Jun. 16, 2011

(65) Prior Publication Data
US 2013/0018126 A1    Jan. 17, 2013

(30) Foreign Application Priority Data
Dec. 11, 2009   (EP) .................................... 09015352

(51) Int. Cl.
| | | |
|---|---|---|
| *B32B 1/00* | (2006.01) |
| *B32B 27/38* | (2006.01) |
| *C08G 18/06* | (2006.01) |
| *C08G 18/28* | (2006.01) |
| *C08G 18/48* | (2006.01) |
| *C08G 18/58* | (2006.01) |
| *C08G 59/14* | (2006.01) |
| *C08G 59/18* | (2006.01) |
| *C08G 18/64* | (2006.01) |
| *C08G 18/80* | (2006.01) |
| *C08G 59/40* | (2006.01) |
| *C08G 59/50* | (2006.01) |

(52) U.S. Cl.
CPC ............ *C08G 59/184* (2013.01); *C08G 18/283* (2013.01); *C08G 18/643* (2013.01); *C08G 18/8064* (2013.01); *C08G 59/4028* (2013.01); *C08G 59/504* (2013.01)

(58) Field of Classification Search
USPC ............ 528/85, 119, 120, 121; 428/402, 403, 428/407
See application file for complete search history.

(56) References Cited

U.S. PATENT DOCUMENTS

| | | | |
|---|---|---|---|
| 4,710,561 A | 12/1987 | Tominaga et al. | |
| 5,128,393 A | 7/1992 | Peng et al. | |
| 8,653,222 B2* | 2/2014 | Orth et al. ........................ | 528/85 |
| 8,979,990 B2* | 3/2015 | Shooter et al. ............. | 106/31.89 |
| 2005/0059794 A1* | 3/2005 | Glass et al. ....................... | 528/86 |
| 2008/0119613 A1* | 5/2008 | Klein et al. ..................... | 525/187 |
| 2009/0221745 A1* | 9/2009 | Orth et al. ....................... | 524/589 |

FOREIGN PATENT DOCUMENTS

| | | |
|---|---|---|
| DE | 3623296 A1 | 1/1988 |
| DE | 3623297 A1 | 1/1988 |
| DE | 19919482 A1 | 11/2000 |
| DE | 10326147 A1 | 3/2005 |
| DE | 102007005720 A1 | 8/2008 |
| DE | 102008010687 A1 | 9/2009 |
| EP | 0270126 A2 | 6/1988 |
| EP | 0318999 A2 | 6/1989 |
| EP | 0747413 A2 | 12/1996 |
| EP | 1593700 A1 | 11/2005 |
| EP | 1650246 A1 | 4/2006 |
| JP | 2009102555 A | 5/2009 |
| WO | WO-2005113677 A1 | 12/2005 |
| WO | WO-2008092687 A1 | 8/2008 |

OTHER PUBLICATIONS

Technical Bulletin for Jeffamine M-2070 (no date).*
Technical Bulletin for Jeffamine M-2005 (no date).*
"International Application No. PCT/EP2010/069182, International Search Report and Written Opinion mailed Apr. 1, 2011", 11 pgs.
"International Application No. PCT/EP2010/069182, Response to Written Opinion dated May 14, 2012", 2 pgs.

* cited by examiner

*Primary Examiner* — Michael J Feely
(74) *Attorney, Agent, or Firm* — Schwegman Lundberg & Woessner, P.A.

(57) ABSTRACT

Addition compound suitable as wetting and dispersing agent, obtainable from the reaction of
A) polyepoxides with
B) at least one primary polyoxyalkyleneamine
C) at least one other aliphatic and/or araliphatic primary amine and
D) at least one modified isocyanate.

22 Claims, No Drawings

POLYETHER-MODIFIED EPOXY AMINE ADDUCTS AS WETTING AND DISPERSING AGENTS

PRIORITY CLAIM TO RELATED APPLICATIONS

This application is a national stage application under 35 U.S.C. §371 of PCT/EP2010/069182, filed Dec. 8, 2010, and published as WO 2011/070074 A1 on Jun. 16, 2011, which claims priority to European Application No. 09015352.9, filed Dec. 11, 2009, which applications and publication are incorporated by reference as if reproduced herein and made a part hereof in their entirety, and the benefit of priority of each of which is claimed herein.

The invention relates to reaction products of epoxides with amines, polyether-modified amines and polyalkylene oxide-modified and/or polyester-modified and/or polyether-polyester-modified isocyanates to form aminic, comblike polymers and also salts thereof as wetting and dispersing agents for pigments and fillers, and also to a process for preparing them. The invention further relates to the use of these reaction products as wetting and dispersing agents for organic and inorganic pigments, and also fillers, in aqueous, solvent-based, and radiation-curable systems.

The aforementioned reaction products are suitable more particularly for producing pigment concentrates and also for stabilizing solids in binders, coating materials, plastics, and plastics mixtures. As wetting and dispersing agents, they reduce the viscosity of such systems, enhance the shelf life and flow properties, and may increase the color strength.

High mechanical forces are needed in order to incorporate solids stably into liquid media. As a consequence it is customary to use agents in order to lower these dispersing forces and hence to minimize not only the overall energy input into the system that is required, but also the dispersing time. The known dispersing agents are mostly surface-active substances which in small quantities are either applied directly to the solid or added to the liquid medium. Even after complete deflocculation of the agglomerated solids, the dispersing process may be followed by instances of reagglomeration, thus wholly or partly negating the dispersing work. In this way, unwanted effects, such as an increase in viscosity in the liquid systems, shade drift or a loss of gloss in paints and coatings may come about.

A multiplicity of various substances are known that are presently used as dispersing agents for pigments and fillers. A review of existing patent literature is found in EP 0 318 999 A. For example, as well as simple compounds of low molecular weight such as lecithin, fatty acids and their salts, and alkylphenol ethoxylates, use is also made of complex structures as wetting and dispersing agents.

One known group of such dispersing agents is based on reaction products of mono- or polyepoxides with amines which comprise an imidazoline moiety. An overview of this group of dispersants is found among others in U.S. Pat. Nos. 5,128,393 and 4,710,561. Another group of dispersing agents is formed from polyepoxide/amine mixtures and their salts. Publications DE 36 23 296 A and DE 36 23 297 A disclose the use of such mixtures as dispersing agents for pigments primarily in organic media, the polyepoxides being novolaks and the amines used being aliphatic, aromatic and/or heterocyclic amines with a low molecular weight.

In more recent times there have been further developments in the field of polyepoxide/amine dispersing agents. In EP 747 413 A, reaction products of aliphatic polyols with epoxides having at least two epoxide groups per molecule are described, as emulsifiers. These compounds, accordingly, do not carry any salifiable nitrogen atoms, and hence exhibit only low affinity for fillers and pigments. In contrast, DE 103 147 A1 describes addition compounds, suitable as wetting and dispersing agents, of mono- or polyfunctional, aromatic epoxides with polyoxyalkylene mono-amines. These specific amines have at least four ether oxygens per molecule. Another application of the specific polyether-substituted amines is disclosed in WO 2005/113677 A1. There, the amines serve as emulsifiers for producing a wide spectrum of liquid inks with a high pigment fraction.

Common to all of the aforementioned dispersing agents is that they have each been developed for a narrow field of use and are therefore geared specifically to the pigment-binder mixture. In systems with greatly different polarity, however, their usefulness is limited.

Another disadvantage of the dispersing agents based exclusively on polyether-substituted amines lies in the limited availability of the amines. At the present time, for example, only about five different amines are available. Polyether-polyester-modified primary amines, in contrast, are not available at all.

Particularly in the context of large-scale industrial applications, the narrow spectrum and availability of the existing wetting and dispersing agents poses a hindrance, since as part of rationalized processing operations it is preferred to use modular components. These modular components ought, in the sense of a modular construction system, to be highly compatible with the other components such as binders, auxiliaries, and solvents.

It is an object of the present invention, therefore, to provide a wetting and dispersing agent that exhibits high compatibility with common binder and solvent systems. At the same time, the wetting and dispersing agent ought to be readily available and to have good long-term stability and shelf life. The wetting and dispersing agents are to reduce the viscosity without adversely affecting the gloss and the haze of a coating system which comprises the wetting and dispersing agent. In addition, a process for preparing such wetting and dispersing agents is to be indicated.

The object is achieved in accordance with the invention by means of an addition compound suitable as a wetting and dispersing agent, obtainable from the reaction of A) polyepoxides with B) at least one primary polyoxyalkyleneamine of the general formula (I)

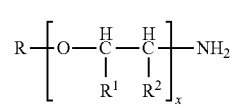

(I)

where R=$C_1$-$C_{24}$ alkyl, $C_5$-$C_{12}$ cycloalkyl, $C_6$-$C_{10}$ aryl, $C_6$-$C_{18}$ aralkyl, $R^1$ and $R^2$ independently of one another may be identical or different and are H, $C_1$-$C_{24}$ alkyl, aryl, and/or —$CH_2$—O—$C_nH_{2n+1}$, and x may be arranged blockwise or randomly and is preferably 10 to 100, more preferably 20 to 70, very preferably 35 to 50, C) at least one other aliphatic and/or araliphatic primary amine of the general formula (II)

$$H_2N-R^6-Z \qquad (II)$$

where $R^6$=alkyl, cycloalkyl, aryl and aralkyl and Z may be a further functional group selected from —OH, tertiary amine or a heterocyclic radical with a 5- or 6-membered ring which as heteroatoms contains preferably N and/or O, such as N-(3-aminopropyl)imidazole or N-(2-amino-ethyl)morpholine, for example, D) at least one modified isocyanate of the general formula (IIIa) and/or (IIIb)

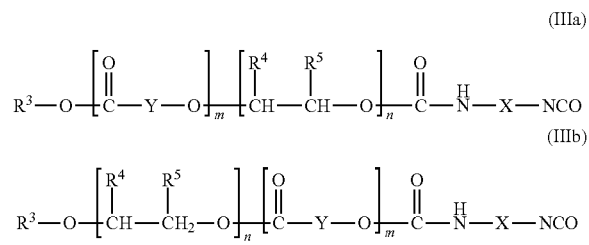

where $R^3$=alkyl, cycloalkyl, aryl and/or aralkyl, $R^4$ and $R^5$ independently of one another are H, alkyl and/or aryl, X=alkylene, cycloalkylene and/or aralkylene, Y=alkylene and/or cycloalkylene, and n and m independently of one another are 0 to 100, preferably 1 to 100, more preferably 2 to 100, the sum n+m being ≥2, to from a urethane.

The urethanes formed preferably have a calculated number-average molecular weight of 1800 to 100 000 g/mol. Particularly preferred are urethanes having a calculated number-average molecular weight of 2000 to 70 000 g/mol, very preferably 10 000 to 60 000 g/mol.

As a result of the use of the polyether-, polyester- and/or polyether-polyester-modified isocyanates, the addition compounds of the invention have a broad availability. The urethane bond additionally present in the compounds of the invention allows not only broad compatibility with common binder-solvent systems but also advantageous long-term stability and shelf life, on account of its chemical inertness. It is particularly surprising that the wetting and dispersing agents are able to reduce the viscosity without adversely affecting the gloss and the haze of a coating system which comprises the wetting and dispersing agent.

As component A it is possible to use aromatics-containing and/or aliphatic polyepoxides. The polyepoxides may contain two or more epoxide groups per molecule, and have at least six carbon atoms. It is also possible to use mixtures of different polyepoxides. Typical examples from the group of the aromatics-containing polyepoxides are reaction products of diphenylolpropane (bisphenol A) with epichlorohydrin and the higher homologs thereof, which are sold, for example, under the brand names D.E.R. or Epikote by Dow Chemical Company and by Resolution Performance Products, respectively. Examples of aliphatic polyepoxides are, for example, 1,6-hexane diglycidyl ether and 1,4-butane diglycidyl ether. The aliphatic polyepoxides may also additionally contain oxygen in the chain, such as, for example, polypropylene glycol diglycidyl ethers and polytetrahydrofuran diglycidyl ethers. These aliphatic polyepoxides are available for example under the trade name Grilonit® from Ems-Chemie.

The polyetheramines of component B are preferably polyethylene glycol-polypropylene glycols having a terminal primary amino group which are prepared starting from methanol, are based on ethylene oxide and propylene oxide, and are available commercially under the trade name Jeffamin® from Huntsman. Also employed, however, are polyetheramines whose polyether moiety is based on different epoxides, such as butylene oxide, 1,2-epoxyhexane, 2-ethylhexyl glycidyl ether or styrene oxide, for example. In this case the distribution of the epoxide units when using different epoxides may take place blockwise or randomly. Through the use of such epoxides for preparing the polyethers, it is possible to adapt as desired the compatibility for different binders or solvents.

The aliphatic and/or araliphatic amines of component C have preferably 3 to 28 carbon atoms. Examples thereof are aminohexane, stearylamine, oleylamine, and also benzylamine or cyclohexylamine. Particularly preferred as additional functional groups are hydroxyl groups or tertiary amino groups. Examples of amines having functional groups are, for example, ethanolamine, butanolamine, 2-amino-2-methyl-1-propanol or else amines having more than just one additional functional group, such as, for example, 2-amino-2-ethyl-1,3-propanediol or 2-amino-2-hydroxymethyl-1,3-propanediol. Especially preferred are, for example, ethanolamine, butanolamine and/or dimethylaminopropylamine. Examples of amines having heterocyclic radicals are N-(3-aminopropyl)imidazole or N-(2-aminoethyl)morpholine.

In accordance with the invention, components A and (B+C) can be reacted with one another in a stoichiometric excess of component A to form epoxide-terminated polymers. Equally in accordance with the invention it is possible for components A and (B+C) to be reacted with one another in a stoichiometric excess of components (B+C), to form amine-terminated polymers. It is preferred to use component A, relative to the sum of the components B and C, in a molar ratio of 33:32 to 32:33. Preference is given to a molar ratio of 21:20 to 20:21, more preferably 11:10 to 10:11.

Components A, B, and C are used preferably in a molar ratio in which A, B, and C are fully reacted.

The molar ratio of component B to component C is preferably 2:30 to 30:2. More preferred is a molar ratio of 3:1 to 1:3, very preferably 3:1 to 3:2.

In another preferred embodiment of the present invention, component D is used in an amount such that 5-100%, preferably 20-100%, and more preferably 40-100% of the OH groups generated by addition of components A and (B+C) are reacted to form urethane.

In one preferred embodiment of the present invention, use is made as component A of diepoxides of the general formula (IV)

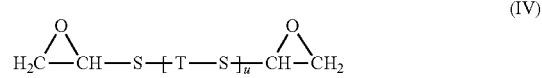

with S=—CH$_2$—O— or —CH$_2$—, T=alkylene, cycloalkylene, arylene or aralkylene, and u=1-8.

Particularly preferred for use as component A are aliphatic diepoxide compounds having on average two epoxy functions per molecule, and with particular preference diglycidyl ethers of diols.

The addition compounds obtained from components A, B, C, and D constitute high-value wetting and dispersing agents with broad compatibility. They can be used in the form in which they are obtained by the two-stage reaction. In order to adapt their properties to specific requirements in each individual case, however, it is desirable in certain cases to modify them further. Described below are suitable modifications based on a reaction with the hydroxyl and/or amino groups present in the addition compounds. In the course of the modification, these groups may be fully or partly reacted.

The modification reactions below may be combined where necessary, to give multiply modified addition compounds. Where two or more modifying reactions are to be carried out in succession, it should be ensured that groups are obtained that are enough reactive for one or more subsequent reactions in the molecule. The stated modifications are advantageous embodiments of the present invention and can be realized by:

1. reaction of the terminal amino groups with isocyanates, lactones, cyclic carbonates or (meth)acrylates,
2. reaction of the terminal epoxide groups with secondary amines or saturated or unsaturated carboxylic acids,
3. reaction of the remaining hydroxyl function with hydroxycarboxylic acids and/or cyclic lactones,
4. reaction of the remaining hydroxyl function with unsaturated cyclic anhydrides, with retention of the double bond for radiation curing,
5. reaction of the remaining hydroxyl function with (meth) acrylic acid and/or (meth)acrylic esters, with retention of the double bond for radiation curing,
6. reaction of the remaining hydroxyl function with isocyanates other than those listed under C,
7. reaction of the remaining hydroxyl function with phosphoric acid or polyphosphoric acid and/or acidic phosphoric esters and/or carboxylic acids, and
8. alkylation or oxidation of the amino group, to form quaternary ammonium salts or nitrogen oxides.

The designation "(meth)acrylic-" refers both to acrylic and to methacrylic compounds. Similarly, the designation "(meth)acrylate-" refers both to acrylate compounds and to methacrylate compounds.

If (meth)acrylic or (meth)acrylate compounds are to be used, then acrylate compounds are preferred.

The free epoxide groups that may have remained in the addition compounds of the invention can be esterified with carboxylic acids as cited under 2.). Preference is given to esterification with (meth)acrylic acid, with retention of the double bond for radiation curing. The free hydroxyl groups that may have remained in the addition compounds of the invention can be esterified as cited under 3., 4., and 5.). The esterification takes place in a way which is known to the skilled person. If free amino groups are additionally present in the addition product of the invention, it is advisable to salify these amino groups prior to the esterification, in order to obtain a satisfactory reaction rate. In the course of this transesterification, terminal OH groups are retained, meaning that the resulting products are notable for particularly broad compatibility in numerous coating systems.

The compounds formed in the addition reaction of the invention, with optionally remaining hydroxyl groups, may additionally be reacted as per 6.) with isocyanates. Urethane formation is carried out in a way which is known to the skilled person. The conversion of the hydroxyl group into a urethane group is preferably accomplished when hydroxyl groups are a disruption in the coating system. Moreover, the further formation of urethane may have favorable consequences for the defoaming effect of the wetting and dispersing agents. Suppression of the tendency toward foaming constitutes an important additional property of the wetting and dispersing agents especially in the case of dispersing operations in aqueous formulations.

The modification of any remaining amino groups, as described under 8.), takes place in a way which is known to the skilled person. For example, quaternization of the amino nitrogen atom can be achieved using alkyl or aralkyl halides, using halocarboxylic esters or epoxides. Such quaternization is preferred when, for example, amino groups are a disruption in the binder system into which the pigment paste is incorporated.

The reaction of the epoxide function of component A with the amino groups of components B and C to form the β-hydroxyamino function may be carried out in a solvent system, but preferably in bulk, in accordance with the processes known to the skilled person. The reaction temperature to be selected here is dependent on the reactivity of the reactants. Many epoxides react with amines even at room temperature. In contrast, for less reactive epoxides, reaction temperatures up to 160° C. may be necessary. Particularly suitable reaction temperatures for the reaction of epoxides with amines are 50-120° C. Catalysts known to the skilled person may optionally be used in order to accelerate the reaction of the epoxide with the amine.

Component D is preferably prepared by the processes as described in DE 199 19 482 A1. For this purpose, monohydroxy compounds are reacted with an excess of diisocyanate, preferably tolylene diisocyanate, and the unreacted portion of the diisocyanate is removed from the reaction mixture.

The object of the present invention is equally achieved by a process for preparing an addition compound suitable as a wetting and dispersing agent, by reaction of A) polyepoxides with B) at least one primary polyoxyalkyleneamine of the general formula (I)

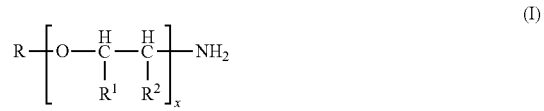

where $R=C_1-C_{24}$ alkyl, $C_5-C_{12}$ cycloalkyl, $C_6-C_{10}$ aryl, $C_6-C_{18}$ aralkyl, $R^1$ and $R^2$ independently of one another may be identical or different and are H, $C_1-C_{24}$ alkyl, aryl, and/or $-CH_2-O-C_nH_{2n+1}$, and x may be arranged blockwise or randomly and is preferably 10 to 100, more preferably 20 to 70, very preferably 35 to 50, C) at least one other aliphatic and/or araliphatic primary amine of the general formula (II)

where $R^6$=alkyl, cycloalkyl, aryl and aralkyl and Z may be a further functional group selected from —OH, tertiary amine or a heterocyclic radical with a 5- or 6-membered ring which as heteroatoms contains preferably N and/or O, such as N-(3-aminopropyl)imidazole or N-(2-amino-ethyl)morpholine, for example, D) at least one modified isocyanate of the general formula (IIIa) and/or (IIIb)

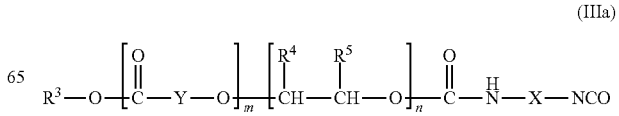

-continued

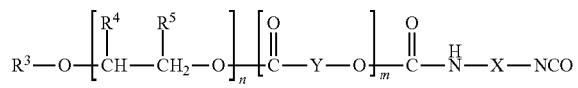
(IIIb)

where R=alkyl, cycloalkyl, aryl and/or aralkyl, $R^4$ and $R^5$ independently of one another are H, alkyl and/or aryl, X=alkylene, cycloalkylene and/or aralkylene, Y=alkylene and/or cycloalkylene, and n and m independently of one another are 0 to 100, preferably 1 to 100, more preferably 2 to 100, the sum n+m being ≥2, to from a urethane.

One preferred embodiment of the process of the invention uses as component A) diepoxides of the general formula IV

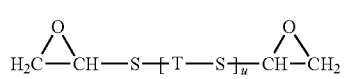
(IV)

with S=—$CH_2$—O— or —$CH_2$—, T=alkyl, cycloalkylene, aryl or aralkyl, and u=1-8. Aliphatic diepoxides are particularly preferred, since they guarantee a low inherent viscosity on the part of the products.

With regard to the use of component D, the amount of this component that is employed is preferably selected such that in the addition reaction 5-100%, preferably 20-100%, and more preferably 40-100% of the OH groups generated by the addition of components A and (B+C) are reacted with formation of urethane.

In this way, especially good compatibility of the addition compound with binders, specifically in aqueous systems, is achieved.

The addition compounds of the invention are used as wetting and/or dispersing agents for organic and/or inorganic pigments or fillers. The dispersing agents may be used alone or together with binders. With particular preference the wetting and dispersing agents of the invention find their application in aqueous and/or solvent-containing coating materials, for the stabilizing and dispersing of pigments and fillers.

In another preferred embodiment, the addition compounds of the invention are used as wetting and/or dispersing agents for organic and/or inorganic pigments or fillers in radiation-curable systems.

Besides their use as wetting and dispersing agents in aqueous and/or solvent-containing and/or radiation-curable systems, it is likewise possible to coat solids in powder or fiber form with the addition compounds of the invention. Coatings of this kind on organic and inorganic solids are carried out in a known way; by way of example, such processes are described in EP 0 270 126 A. Specifically in the case of pigments, coating of the pigment surface may take place during or after the synthesis of the pigments, by means, for example, of addition of the addition compounds of the invention to the pigment suspension. Pigments pretreated in this way exhibit great ease of incorporation into the binder system, improved viscosity and flocculation characteristics, and good gloss as compared with untreated pigments. Furthermore, the addition compounds of the invention are suitable for dispersing, for example, effect pigments in nail varnishes.

The dispersing agents of the invention are used preferably in an amount of 0.5-60% by weight, based on the solid to be dispersed. With specific solids, however, substantially higher amounts of dispersant may also be necessary for the dispersing operation.

The amount of dispersing agent used is dependent substantially on the size and nature of the surface of the solid to be dispersed. Carbon black, for example, requires substantially larger quantities of dispersing agent than titanium dioxide. EP 0 270 126 A gives examples of pigments and fillers. Further examples are based on new developments, especially in the area of organic pigments, such as in the class of the diketopyrrolopyrroles. Magnetic pigments based on pure iron or mixed oxides, as well, can be introduced in the dispersions with the aid of the dispersing agents of the invention. Furthermore, mineral fillers as well, such as calcium carbonate and calcium oxide, or flame retardants such as aluminum hydroxide or magnesium hydroxide can be dispersed. In addition, matting agents as well, such as silicas, are dispersed and stabilized.

The invention is illustrated additionally by the examples below, without being confined to these examples. Unless indicated otherwise, references to parts are to parts by weight, and to percentages are percentages by weight.

EXAMPLES

Example 1

Inventive

A 250 ml four-neck flask with KPG stirrer, nitrogen line, and intensive condenser was charged with 5.93 g (0.003 mol) of Jeffamin M 2070 and 2.22 g (0.021 mol) of benzylamine, and this initial charge was heated to 100° C. with stirring. Over the course of 3 hours, 6.22 g (0.022 mol) of Grilonit RV 1812 were added dropwise. After a reaction time totaling 5 hours, 63.00 g (0.03 mol) of TDI-M2000 isocyanate adduct were added dropwise. After reaction time of a further 3 hours at 100° C., the reaction product was diluted with 115.13 g of fully demineralized water. The product produced is a yellowish, clear solution with 40% solids.

The further examples were carried out in accordance with the instructions given above, using the reactants shown in the table given below.

| Ex. | Epoxides (A) | Polyether-amine (B) | Amine (C) | Molar ratio A:(B + C) | Isocyanate adduct | OH groups reacted |
|---|---|---|---|---|---|---|
| 2 | Grilonit RV 1812 | Jeffamin M 2070 | benzylamine | 15:(2 + 14) | TDI-M2000 | 75% |
| 3 | Grilonit RV 1812 | Jeffamin M 2070 | benzylamine | 15:(8 + 8) | TDI-MP41-2000 | 65% |

-continued

| Ex. | Epoxides (A) | Polyether-amine (B) | Amine (C) | Molar ratio A:(B + C) | Isocyanate adduct | OH groups reacted |
|---|---|---|---|---|---|---|
| 4 | Grilonit RV 1812 | Jeffamin M 2070 | benzylamine | 20:(5 + 16) | TDI-B11/120 | 50% |
| 5 | Grilonit RV 1806 | Jeffamin M 2005 | cyclohexyl-amine | 3:(2 + 2) | TDI-B11/120 | 35% |
| 6 | Grilonit RV 1812 | Jeffamin M 2005 | benzylamine | 15:(8 + 8) | TDI-M2000 | 50% |
| 7 | Grilonit F704 | Jeffamin M 2005 | benzylamine | 12:(4 + 7) | TDI-MP41-2000 | 50% |

TDI: Tolylene diisocyanate (isomer mixture)
M2000: Methoxypolyethylene glycol (molar weight 2000)
MP41-2000: Methoxypolyethylene-polypropylene glycol (molar weight 2000, EO/PO = 4/1)
Grilonit RV 1806: 1,4-Butane diglycidyl ether
Grilonit RV 1812: 1,6-Hexane diglycidyl ether
Grilonit F704: Polypropylene glycol diglycidyl ether (about 7 PO)
B11/120: Butoxypolyethylene glycol-polypropylene glycol (molar weight: about 2000; EO/PO: 1:1)
Jeffamin M2070: Methoxypolyethylene glycol-polypropylene glycol amine (molar weight: about 2000; EO/PO: 32:10)
Jeffamin M2005: Methoxypolyethylene glycol-polypropylene glycol amine (molar weight: about 2000; EO/PO: 6:29)

Performance Assessment

To test the activity of the dispersing agents of the invention, binder-free pigment pastes were prepared, which were incorporated into a binder (Johncryl 8052). The viscosity here was assessed. Following application and curing of the completed pigment coating materials, the drawdowns were then inspected, and measurements of gloss and haze were performed.

The components of the formulation are dispersed for 40-60 minutes at 40° C. and 10 000 rpm using a Dispermat CV from VMA-Getzmann GmbH Byk 017: Defoamer from Byk-Chemie GmbH Johncryl 8052: Acrylate dispersion from Johnson Polymers Irgalithrot FBN: Red Naphtol AS pigment from Ciba
Printex 35: Black pigment (furnace black) from Degussa Sunfast blue 249-1282: Phthalocyanine pigment from Sun-Chemicals Formulation of the Pigment Paste

| 15% sop (solid on pigment) | Printex 35 | Sunfast blue 249-1282 | Irgalith rot FBN |
|---|---|---|---|
| Water | 44.4 | 44.4 | 44.4 |
| Additive in 40% form | 15.0 | 15.0 | 15.0 |
| Byk-017 | 0.5 | 0.5 | 0.5 |
| Pigment | 40.0 | 40.0 | 40.0 |
| Acticide MBS | 0.1 | 0.1 | 0.1 |
|  | 100.0 | 100.0 | 100.0 |

The pigment pastes are then added in a ratio of 30:70 to the Johncryl 8052 binder.

Assessment

As a comparative example (not inventive), example 2 of WO 2008/092687 of Byk-Chemie was employed.

Printex 35

| | 1 d RT | | | 7 d 50° C. | | |
|---|---|---|---|---|---|---|
| | Viscosity at 1 1/s (Pa s) | Haze | Gloss (60°) | Viscosity at 1 1/s (Pa s) | Haze | Gloss (60°) |
| Comp. example | 0.94 | 130 | 83 | 2.85 | 194 | 83 |
| Example 1 | 0.18 | 119 | 82 | 0.18 | 180 | 82 |
| Example 2 | 0.26 | 129 | 80 | 0.31 | 130 | 81 |
| Example 3 | 0.17 | 131 | 81 | 0.16 | 95 | 83 |
| Example 4 | 0.14 | 130 | 79 | 0.18 | 158 | 78 |
| Example 5 | 0.22 | 128 | 81 | 0.18 | 119 | 82 |
| Example 6 | 0.20 | 212 | 78 | 0.23 | 189 | 79 |
| Example 7 | 0.18 | 150 | 79 | 0.19 | 236 | 78 |

Dispersing: 60 min, 10 000 rpm, 40° C., 1:1.5 beads 1 mm
Sunfast blue 249-1282

| | 1 d RT | | | 7 d 50° C. | | |
|---|---|---|---|---|---|---|
| | Viscosity at 1 1/s (Pa s) | Haze | Gloss (60°) | Viscosity at 1 1/s (Pa s) | Haze | Gloss (60°) |
| Comp. example | 5.65 | 422 | 61 | 5.83 | 249 | 66 |
| Example 1 | 0.24 | 205 | 70 | 0.15 | 203 | 71 |
| Example 2 | 0.17 | 204 | 69 | 0.22 | 204 | 69 |
| Example 3 | 0.31 | 192 | 70 | 0.22 | 191 | 69 |
| Example 4 | 0.16 | 225 | 68 | 0.16 | 205 | 70 |
| Example 5 | 0.16 | 231 | 68 | 0.13 | 265 | 68 |
| Example 6 | 0.28 | 225 | 65 | 0.35 | 278 | 62 |
| Example 7 | 0.19 | 460 | 61 | 0.16 | 308 | 67 |

Dispersing: 40 min, 10 000 rpm, 40° C., 1:1.5 beads 1 mm
Irgalith rot FBN

| | 1 d RT | | | 7 d 50° C. | | |
|---|---|---|---|---|---|---|
| | Viscosity at 1 1/s (Pa s) | Haze | Gloss (60°) | Viscosity at 1 1/s (Pa s) | Haze | Gloss (60°) |
| Comp. example | 35.90 | 377 | 81 | 57.70 | 329 | 82 |
| Example 1 | 3.77 | 555 | 75 | 18.60 | 202 | 85 |
| Example 2 | 0.91 | 358 | 78 | 2.47 | 233 | 80 |
| Example 3 | 1.58 | 319 | 80 | 7.64 | 225 | 80 |
| Example 4 | 1.03 | 246 | 80 | 3.95 | 203 | 77 |
| Example 5 | 1.11 | 240 | 78 | 4.55 | 216 | 76 |
| Example 6 | 1.77 | 329 | 77 | 4.93 | 241 | 78 |
| Example 7 | 1.27 | 293 | 78 | 3.91 | 245 | 78 |

Dispersing: 40 min, 10 000 rpm, 40° C., 1:1.5 beads 1 mm

The invention claimed is:

1. An addition compound suitable as wetting and dispersing agent, obtained by:
   the reaction of:
   A) polyepoxides,
   B) at least one primary polyoxyalkyleneamine of the general formula (I)

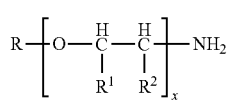
   (I)

where R is selected from the group consisting of $C_1$-$C_{24}$ alkyl, $C_5$-$C_{12}$ cycloalkyl, $C_6$-$C_{10}$ aryl, and $C_6$-$C_{18}$ aralkyl, $R^1$ and $R^2$ are each independently selected from the group consisting of H, $C_1$-$C_{24}$ alkyl, aryl, and alkoxymethyl, and x is at least 2 yielding a blockwise or random arrangement, and
   C) at least one other aliphatic and/or araliphatic primary amine of the general formula (II)

$H_2N-R^6-Z$   (II)

where $R^6$ is selected from the group consisting of alkyl, cycloalkyl, aryl and aralkyl, Z is an optional substituent group selected from the group consisting of —OH, tertiary amine, and a heterocyclic radical with a 5- or 6-membered ring, to form epoxide-terminated polymers comprising reactive hydroxyl groups or amine-terminated polymers comprising reactive hydroxyl groups; and
   reacting the epoxide-terminated polymers comprising reactive hydroxyl groups or amine-terminated polymers comprising reactive hydroxyl groups with:
   D) at least one modified isocyanate of the general formula (IIIa) and/or (IIIb)

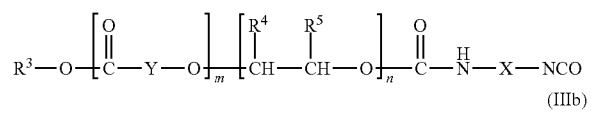
   (IIIa)

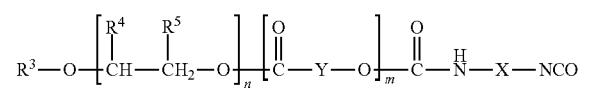
   (IIIb)

where $R^3$ is selected from the group consisting of alkyl, cycloalkyl, aryl, and aralkyl, $R^4$ and $R^5$ are each independently selected from the group consisting of H, alkyl, and aryl, X is selected from the group consisting of alkylene, cycloalkylene, and aralkylene, Y is selected from the group consisting of alkylene and cycloalkylene, and n and m are independently 0 to 100, where the sum n+m≥2,
   to form a urethane.

2. The addition compound as claimed in claim 1, wherein component A are diepoxides of the general formula (IV)

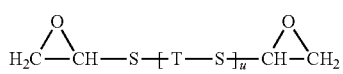
   (IV)

with S is —$CH_2$—O— or —$CH_2$—, T is selected from the group consisting of alkylene, cycloalkylene, arylene, and aralkylene, and u is 1-8.

3. The addition compound as claimed in claim 1, wherein the component B are polyethylene glycol-polypropylene glycols having a terminal primary amino group, which are prepared starting from methanol and are based on ethylene oxide and propylene oxide.

4. The addition compound as claimed in claim 1, wherein in a further step any terminal amino groups present are reacted with isocyanates, lactones, cyclic carbonates or (meth)acrylates.

5. The addition compound as claimed in claim 1, wherein in a further step any terminal epoxide groups present are reacted with secondary amines or saturated or unsaturated carboxylic acids.

6. The addition compound as claimed in claim 1, wherein in a further step any remaining hydroxyl functions are reacted with hydroxycarboxylic acids and/or cyclic lactones.

7. The addition compound as claimed in claim 1, wherein in a further step any remaining hydroxyl functions are reacted with unsaturated cyclic anhydrides with retention of the double bond for radiation curing.

8. The addition compound as claimed in claim 1, wherein in a further step any remaining hydroxyl functions are reacted with (meth)acrylic acid and/or (meth)acrylic esters with retention of the double bond for radiation curing.

9. The addition compound as claimed in claim 1, wherein in a further step any remaining hydroxyl functions are reacted with isocyanates other than those set out under D.

10. The addition compound as claimed in claim 1, wherein in a further step any remaining hydroxyl functions are reacted with phosphoric acid or polyphosphoric acid and/or acidic phosphoric esters and/or carboxylic acids.

11. The addition compound as claimed in claim 1, wherein in a further step there is an alkylation or oxidation of any remaining amino groups to form quaternary ammonium salts or nitrogen oxides.

12. The addition compound as claimed in claim 1, wherein x is from 10 to 100.

13. The addition compound as claimed in claim 1, wherein x is from 20 to 70.

14. The addition compound as claimed in claim 1, wherein x is from 35 to 50.

15. The addition compound as claimed in claim 1, wherein the alkoxymethyl is $CH_3OCH_2$.

16. The addition compound as in claimed in claim 15, wherein x is from 10 to 100.

17. The addition compound as claimed in claim 1, wherein $R^1$ and $R^2$ are each independently selected from the group consisting of $C_1$-$C_{24}$ alkyl, and aryl.

18. The addition compound as in claimed in claim 17, wherein x is from 10 to 100.

19. A wetting and/or dispersing agent for organic and/or inorganic pigments or fillers comprising the addition compound as claimed in claim 1.

20. Solids in powder or fiber form that are coated with the addition compounds as claimed in claim 1.

21. A process for preparing an addition compound suitable as wetting and dispersing agent, comprising:
reacting:
A) polyepoxides,
B) at least one primary polyoxyalkyleneamine of the general formula (I)

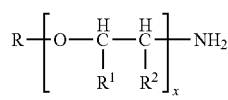

(I)

where R is selected from the group consisting of $C_1$-$C_{24}$ alkyl, $C_5$-$C_{12}$ cycloalkyl, $C_6$-$C_{10}$ aryl, and $C_6$-$C_{18}$ aralkyl, $R^1$ and $R^2$ are each independently selected from the group consisting of H, $C_1$-$C_{24}$ alkyl, aryl, and alkoxymethyl, and x is at least 2 yielding a blockwise or random arrangement, and C) at least one other aliphatic and/or araliphatic primary amine of the general formula (II)

$H_2N$—$R^6$—$Z$ (II)

where $R^6$ is selected from the group consisting of alkyl, cycloalkyl, aryl and aralkyl, Z is an optional substituent group selected from the group consisting of —OH, tertiary amine, and a heterocyclic radical with a 5- or 6-membered ring, to form epoxide-terminated polymers comprising reactive hydroxyl groups or amine-terminated polymers comprising reactive hydroxyl groups; and reacting the epoxide-terminated polymers comprising reactive hydroxyl groups or amine-terminated polymers comprising reactive hydroxyl groups with:

D) at least one modified isocyanate of the general formula (IIIa) and/or (IIIb)

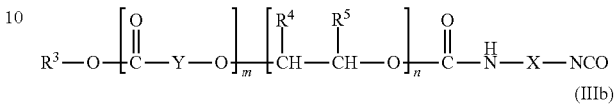

(IIIa)

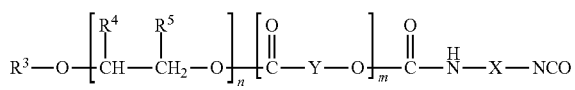

(IIIb)

where $R^3$ is selected from the group consisting of alkyl, cycloalkyl, aryl, and aralkyl, $R^4$ and $R^5$ are each independently selected from the group consisting of H, alkyl, and aryl, X is selected from the group consisting of alkylene, cycloalkylene, and aralkylene, Y is selected from the group consisting of alkylene and cycloalkylene, and n and m are independently 0 to 100, where the sum n+m≥2, to form a urethane.

22. The process as claimed in claim 21, wherein component A are diepoxides of the general formula (IV)

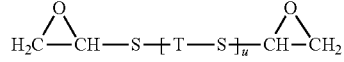

(IV)

with S is —$CH_2$—O— or —$CH_2$—, T is selected from the group consisting of alkylene, cycloalkylene, arylene, and aralkylene, and u is 1-8.

* * * * *